US006702364B2

(12) United States Patent
Neel

(10) Patent No.: US 6,702,364 B2
(45) Date of Patent: Mar. 9, 2004

(54) METHOD AND APPARATUS FOR REDUCING DRAG ON A VEHICLE IN MOTION AND CHANNELING AIR FLOW TO FORM A BUG SHIELD

(75) Inventor: John Stephenson Neel, St. George, UT (US)

(73) Assignee: Vor-Tex Industries, St. George, UT (US)

( * ) Notice: Subject to any disclaimer, the term of this patent is extended or adjusted under 35 U.S.C. 154(b) by 0 days.

(21) Appl. No.: 10/217,752

(22) Filed: Aug. 12, 2002

(65) Prior Publication Data

US 2004/0026954 A1 Feb. 12, 2004

(51) Int. Cl.[7] .................................................. B60J 1/20
(52) U.S. Cl. ...................................... 296/180.2; 296/91
(58) Field of Search ........................... 296/180.1, 180.2, 296/180.3, 180.4, 180.5, 91, 95.1; 224/130, 199, 200

(56) References Cited

U.S. PATENT DOCUMENTS 3,647,256 A * 3/1972 Cox ............................ 296/91
4,142,758 A * 3/1979 Scaife ......................... 296/91
4,357,045 A * 11/1982 Kinford, Jr. ............. 296/180.2
5,082,321 A * 1/1992 Brewer ........................ 296/91
6,276,636 B1 * 8/2001 Krastel .................... 296/180.1

FOREIGN PATENT DOCUMENTS

GB 2076760 A * 12/1981

OTHER PUBLICATIONS

Aviat A–1, A–1A, A–1B Husky, MICRO Vortex Generator Kit, Husky Catalog, Micro AeroDynamics, Inc., Vortex Generator Technology, Anacortes, Washington May 21, 2002.

* cited by examiner

*Primary Examiner*—Stephen T. Gordon
*Assistant Examiner*—Jason Morrow
(74) *Attorney, Agent, or Firm*—Donald R. Boys; Central Coast Patent Agency, Inc.

(57) ABSTRACT

A system for reducing turbulence and therefore improving fuel efficiency for land-operated vehicles uses at least one linear array of vortex generators along typically a leading edge of a vehicle profile. I addition an aerodynamic bug diversion system is provided for creating and directing an airflow shield to prevent bugs and other lightweight debris from hitting the windshield of a moving vehicle.

11 Claims, 6 Drawing Sheets

Bug Path
100
100
301

METHOD AND APPARATUS FOR REDUCING DRAG ON A VEHICLE IN MOTION AND CHANNELING AIR FLOW TO FORM A BUG SHIELD

FIELD OF THE INVENTION

The present invention is in the field of reducing drag on land operated vehicles, and pertains particularly to a system for channeling air to reduce frictional drag and to form a bug guard from the channeled and directed airflow.

BACKGROUND OF THE INVENTION

The art of aerodynamic design is one of continual change and improvement. In addition to streamline profiling of surfaces belonging to aerodynamic vehicles of ground, air and water types, a number of aerodynamic aids have been provided in the form of accessories that may be attached to vehicles at strategic locations with the idea of reducing drag on those vehicles. Air-foils of various designs are the most recognized of these products.

With respect to road transport vehicles such as semi tractor trailers and the like, the bluff profile inherent with such vehicles causes more drag when moving through air than with streamlined profiles that are not practical in production of such vehicles. Therefore, a large market exists for ways to reduce drag on such bluff-bodied vehicles to improve fuel use when the equipped vehicles are driven at certain speeds.

Aerodynamic drag on bluff-bodied vehicles consists mainly of pressure drag with skin friction created by moving air and base drag, which forms part of the total drag coefficient on the vehicle. Air-flow over bluff bodies comprises large wake production and smaller vortex shedding. The well-known Reynolds number associated with drag on small and medium vehicles falls in the sub-critical range of ($1.0$ to $2.0 \times 10^6$). Total drag force associated with such typical flow patterns is very high. A considerable amount of energy is therefore expended in overcoming such forces.

Streamlining vehicle designs is one of the most popular known methods for reducing aerodynamic drag. The effectiveness of rounding corners in design can be measured by utilizing a simple two-dimensional square section under test. The drag coefficient on such a square section at sub-critical Reynolds numbers is approximately 2.0. Maximally rounded corners improve the coefficient to a limiting factor of approximately 1.0 or a 50% reduction in drag without major design change.

Small vortex generators are known in the art, and are used in typically small aircraft to increase lift. Referring now to FIG. 1 of this specification, a vortex generator is illustrated in perspective view. Generator 100 has a base portion 101 that makes contact with the surface of a vehicle to which it is mounted and a fin portion 102 formed at a substantially upright direction from the base of the unit.

Typically, an array of such generators are arranged on a leading-edge surface of an aircraft wing to increase lift. Referring now to FIGS. 2*a*, 2*b*, and 2*c*, the generator of FIG. 1 is illustrated in Top, Side, and End views to better show construction. In FIGS. 2*a* and 2*c*, part of fin 102 is shown removed along an angle D for the purpose of further drag reduction in the design. Dimensions B (FIG. 2*a*), C (FIG. 2*b*) and E (FIG. 2*c*) can vary according to application.

An object of the present invention is to reduce drag and to increase fuel efficiency of a bluff-body vehicle through strategic alignment and positioning of vortex generators at leading edges of the vehicle. A further object of the present invention is to use the laminar flow enhanced by added vortex generators to circumvent a common problem of bug collision with windshields of such vehicles while traveling at freeway speeds.

SUMMARY OF THE INVENTION

In a preferred embodiment of the present invention an aerodynamic bug diversion system for creating and directing an airflow shield to prevent bugs and other lightweight debris from hitting the windshield of a moving vehicle is provided, comprising an array of vortex generators affixed in a line substantially at a right angle to the direction of vehicle travel at a leading edge of the vehicle for creating a channeled and uniform laminar airflow, and an airfoil having at least 2 foils held spaced apart and substantially parallel to one another for collecting and redirecting the airflow created by the vortex array. The system is characterized in that the airflow through the airfoil is redirected as a substantially flat and uniform flow traveling upward in a plane substantially parallel to the plane of the windshield providing a divertive shield against bugs and debris hitting the windshield.

In some embodiments the airfoil is formed of one polymer piece in a molding operation. In other embodiments the airfoil may be formed of 2 or more polymer pieces and is assembled. In some cases the at least two foils are held spaced apart by a plurality of support fins, the fins aiding in channeling the air flow. Various materials can be used, such as aluminum.

In some embodiments the airfoil can be adjustable to a specific profile, adjusting one or both of the spacing and the direction.

In another aspect of the invention an airfoil for directing an airflow shield to prevent bugs and other lightweight debris from hitting the windshield of a moving vehicle is provided, comprising a base foil having a forward protruding lip for collecting incoming airflow and an upright curvature substantially following the angle of protrusion of the windshield from the vehicle, and an upper foil connected to and spaced-apart from the base foil at a position elevated from and substantially parallel to the base foil. The airfoil is characterized in that the space between the base foil and the upper foil functions to redirect airflow in a path substantially parallel to the windshield, forming a bug shield of moving air.

In some cases the upper foil is held rigidly above the base foil by a plurality of support fins, the fins aiding in channeling the airflow. The apparatus can be formed of one polymer piece in a molding operation, of two or more pieces. Various materials can be used, such as aluminum. The airfoil may be adjustable in one or both of direction and/or spacing. Further, there may be two or windshield support feet adapted as standoffs to the windshield.

In another aspect of the invention a method for preventing bugs and other lightweight debris from hitting the windshield of a vehicle is provided, comprising steps of (a) collecting an incoming airflow in an airfoil having at least an upper foil and a base foil while the vehicle is in motion; and (b) redirecting the captured airflow through the airfoil in an upward direction substantially parallel to the windshield.

In some embodiments, in step (a), the incoming airflow is channeled, prior to the airfoil, through an array of vortex generators. The airfoil may be a contiguous piece formed in a molding operation, or may be made of two or more pieces that are assembled together.

In some cases the airfoil is adjustable in one or both of spacing and direction. Also in some cases the foils comprising the airfoil are held apart by a plurality of support fins, the fins aiding in channeling the air flow created by the vortex array. Redirection in preferred embodiments is accomplished through curvatures formed in the airfoil.

In yet another aspect of the invention a system for reducing drag on a land-operating vehicle, and therefore increasing fuel efficiency is provided, comprising an array of vortex generators, each presenting a substantially vertical foil to an airstream created by driving the vehicle through ambient air, the array affixed to a surface of the vehicle and extending substantially in a line at a right angle to the direction of vehicle travel, the system reducing turbulence and enhancing laminar flow.

In some embodiments the line of generators is imposed along a forward position on a hood of the vehicle. In other embodiments the line of generators is imposed along a forward position on a cab top of the vehicle. In yet other embodiments a first line of generators imposed along a forward position on a cab top of the vehicle, and a second line of generators along a forward position of a hood of the vehicle. The individual generators may be aligned to spread the laminar flow created to a width greater than the width of the line of generators.

In embodiments of the invention taught below in enabling detail, for the first time a system is provided wherein vortex generators are used to reduce drag and thusly lower operating costs for land vehicles, such as trucks and buses. In addition, a system is provided that eliminates bug impingement on windshields of such vehicles, and the bug system can be used with the vortex generators as well.

BRIEF DESCRIPTION OF THE DRAWING FIGURES

DESCRIPTION OF THE PREFERRED EMBODIMENTS

The inventor provides a system for channeling air using vortex generators and techniques, and also directing the channeled air in a way to eliminate bug collision with a windshield of a bluff-body vehicle.

Figure 1:
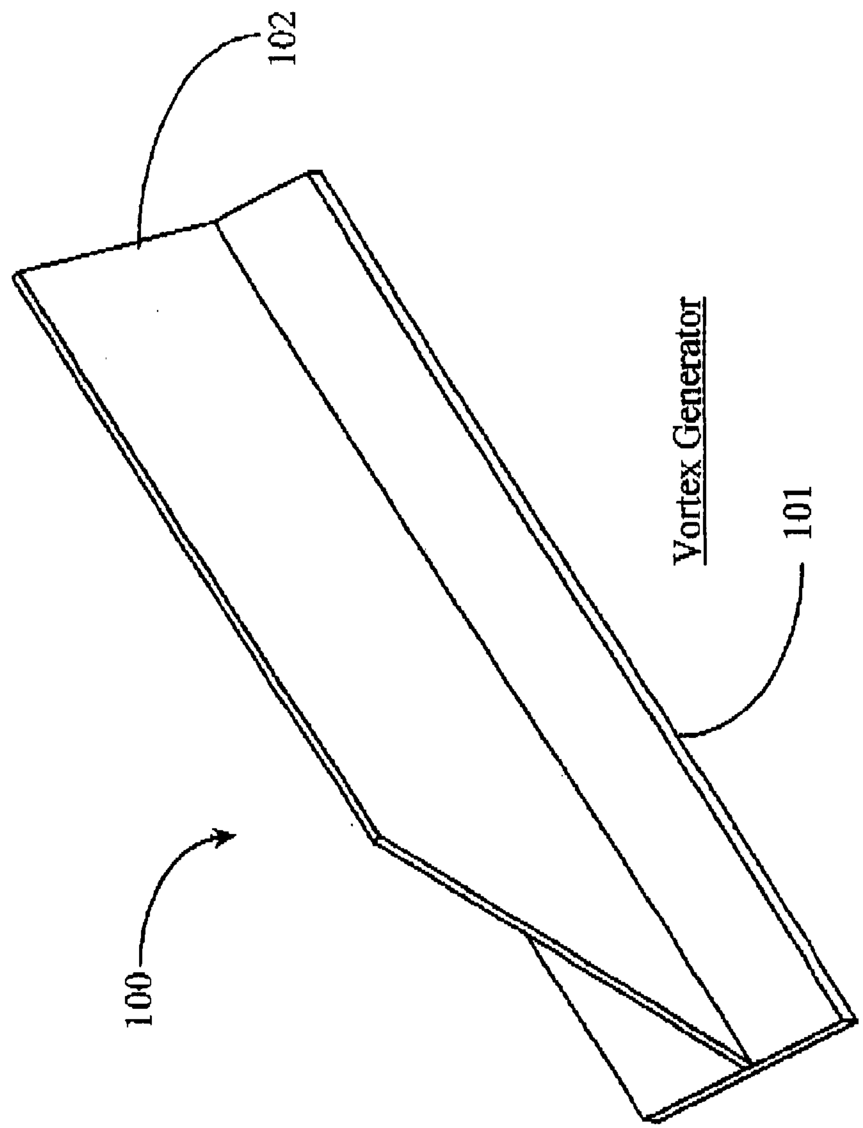
FIG. 1 is a perspective view of a vortex generator according to prior art.
Figure 2B:
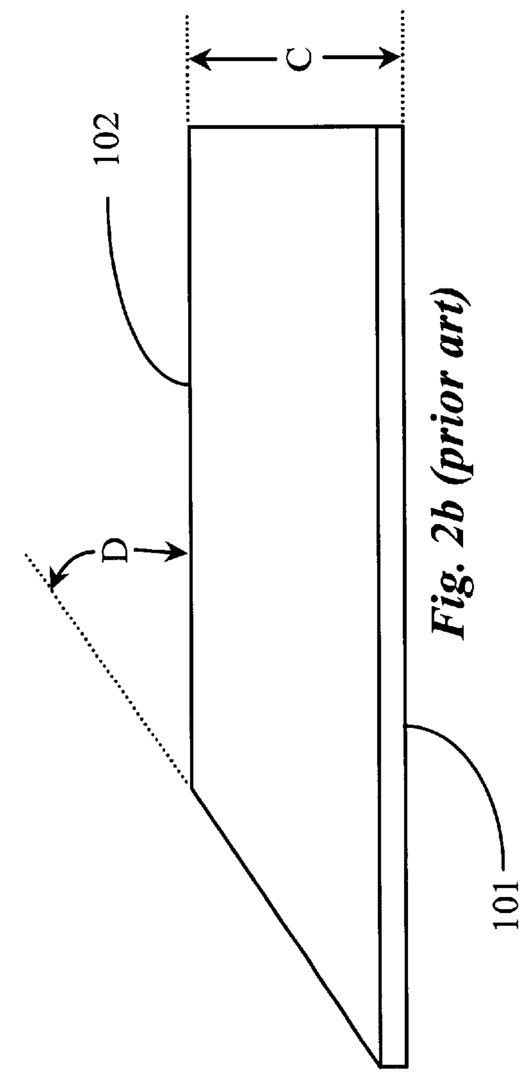
FIG. 2B is an elevation view of the generator device of FIG. 1.
Figure 2C:
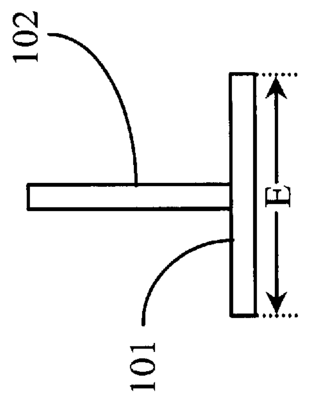
FIG. 2C is and end view of the generator device of FIG. 1.
Figure 2A:
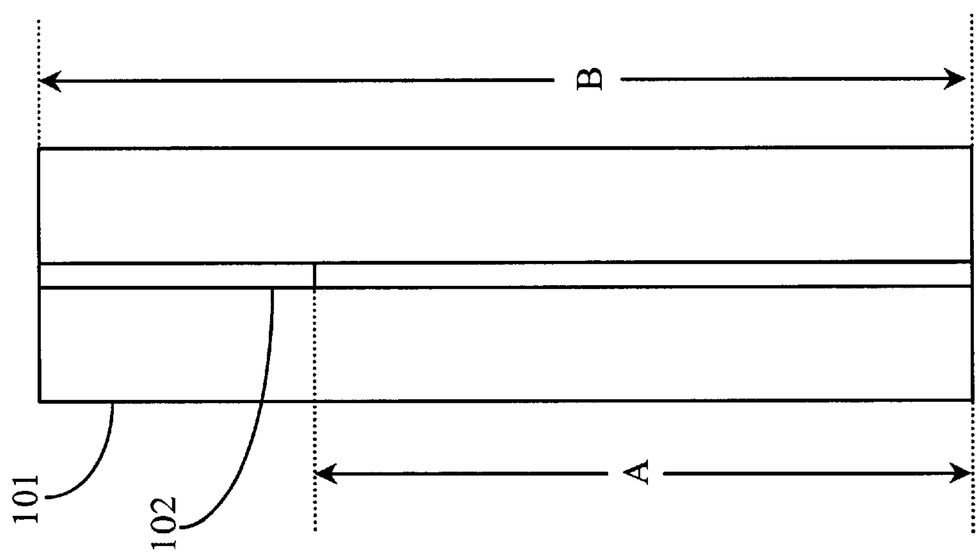
FIG. 2A is an overhead view of the generator device of FIG. 1.
Figure 3:
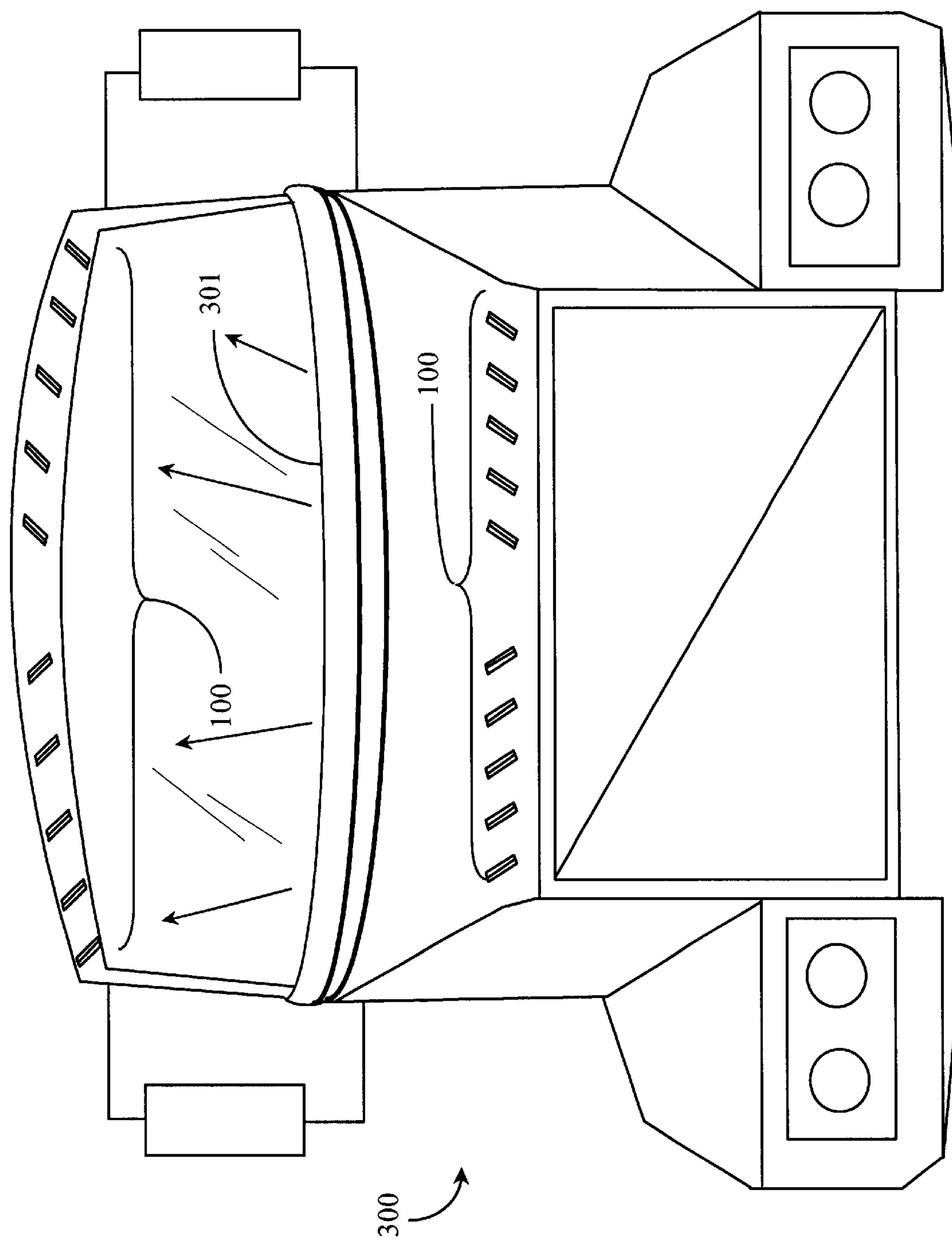
FIG. 3 is a front elevation view of an array of the vortex generators of FIG. 1 mounted to a land vehicle according to an embodiment of the present invention.

FIG. 3 is a front elevation view of an array of vortex generators 100 of FIG. 1 and a bug foil apparatus mounted to a vehicle according to an embodiment of the present invention. A tractor of a semi tractor-trailer style truck is illustrated in this example as a bluff-bodied vehicle that would benefit from the system of the present invention. An array of vortex generators 100 is mounted to the leading-edge surface of truck 300, along the front of the hood. A particular arrangement of the generators is provided such that the generators direct the air flow to fan out to the breadth of the windshield of truck 300. This is accomplished by angling generators 100 in the array applied to the truck hood. In addition the laminar flow layer created is directed to enter a forward scoop provided on a bug foil apparatus 301. The actual angle of mounting for generators 100 in the illustrated array may vary according to the application. The angle is exaggerated in this example for illustrative purpose only. A 30 to 35 degree offset from a 90-degree axis is about right for most truck applications. As can be seen in this view, there are fourteen generators total in the array. One or more vertically aligned generators (not shown) can be inserted into the array at center without departing from the spirit and scope of the invention and without reducing efficiency of the array in reducing drag.

Bug foil apparatus 301 is aerodynamically designed to receive the mostly laminar air flow layer created by the generators and to redirect the air flow in a direction substantially parallel to the windshield to cause, in effect, a fast moving and uniform layer of air functioning as a shield against bug collision.

Bug foil apparatus 301 in one embodiment is formed of one contiguous piece of durable polymer such as would be the case for injection molding. In another embodiment, foil 301 is molded in two or more pieces, particularly an upper foil and a lower foil that may be assembled together. Bug foil apparatus 301 may be side mounted to truck 300 using conventional mounting hardware (not shown). In another embodiment foil 301 may be secured to the vehicle surface immediately adjacent to the rearward boundary of the hood element so as not to interfere with normal raising and lowering of the vehicles hood apparatus. In a preferred embodiment foil 301 has 2 foils spaced apart and joined together in a substantially parallel configuration (one atop the other) by a plurality of support fins (not visible in this example). The space created between the two foils acts to redirect the fast moving, mostly laminar air layer from the vehicle hood in a direction upwards and parallel with the windshield approximately in the direction of the arrows illustrated.

The benefit of cooperation between generators 100 and foil 301 is that the re-directed air flow is substantially flat, laminar, and fast moving against the windshield providing an effective barrier against bugs presented in the line of the windshield while truck 300 is moving at freeway speeds. Bug foil 301 stands off of the windshield of truck 300 in such a way as to clear the windshield wiper apparatus and allow it to operate unimpeded, and to avoid turbulence that would otherwise be created.

A second array of vortex generators 100 is strategically located immediately above the windshield of truck 300 in substantially the same angle of placement as the first-mentioned array. This particular array is not operative in the system of foil 301, but is provided simply for further vortex generation and drag reduction at the position at the top of the cab of the truck 300.

Figure 4:
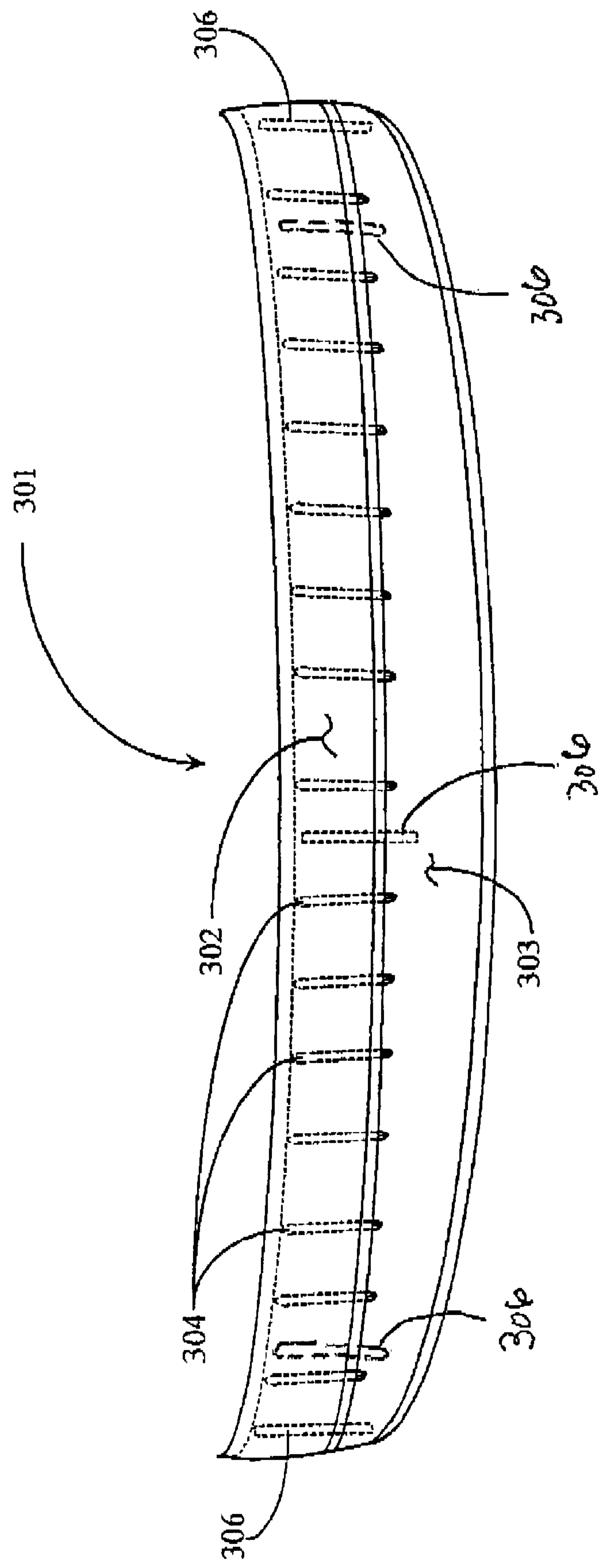
FIG. 4 is a front view of a bug foil apparatus according to an embodiment of the present invention.

FIG. 4 is a front elevation view of bug foil 301 according to an embodiment of the present invention. Foil 301 comprises 2 main foils. A foil 303 is provided as a base foil and a foil 302 is provided as an upper foil in the assembly. Base foil 301 is formed with an elongated lip spanning the width of foil 301 and curved generally to adapt to the curve of a windshield where the windshield abuts the vehicle dash frame. The exact amount of elongation and curve depends on the curvature of the windshield and angle of protrusion of the windshield above the vehicle as generally viewed from the side of the vehicle. Base foil 303 rests directly on the vehicle surface behind the hinge location of the vehicle hood so that no air enters beneath base foil 303 in operation. The elongated portion of base foil 303 acts primarily as a scoop for capturing the fast moving air layer created by vortex generators (100) described above with reference to FIG. 3.

Foil 302 is held in an elevated and substantially parallel position from base foil 303 by a plurality of standoff fins 304 distributed strategically along the width of foil 301. Fins 304 help to channel the air much in the same way as the vortex generators. Fins 304 are disposed at slight angles in between base foil 303 and upper foil 302 to help direct the airflow in a strategic fashion as to spread the flow evenly over the windshield. As seen in this view, the fins disposed left of center are angled slightly to the left and the fins disposed to the right of center are angled slightly to the right. 30 to 35 degrees divergence of 90 degrees is sufficient for the purpose.

Foil 301 has at least 5 windshield support feet 306 formed thereon at strategic locations on the underside of base foil 303. Support feet 306 are formed generally in the same shape as standoff fins 304. Foil 301 is held in an elevated position above standard windshield wiper apparatus by support feet 306. Feet 306 are positioned just out of operating reach of the windshield wiper assembly in operation. In this example there are five feet 306, two on either side of foil 301 and one situated at center, but in many embodiments there are two supports at each of the outboard ends, as many wiper patterns overlap, and a center support still can be used. In this way foil 301 is held above the wiper assembly and is held rigid so that it does not flex considerably under wind pressure. Moreover, wind pressure against base foil 303 acts to urge the foil to its mating surface preventing any air from entering underneath. This configuration also acts to prevent typical airflow turbulence and significant drag from occurring against the wiper assembly on a normal vehicle in motion and protects the wiper assembly from bugs and other debris.

Figure 5:
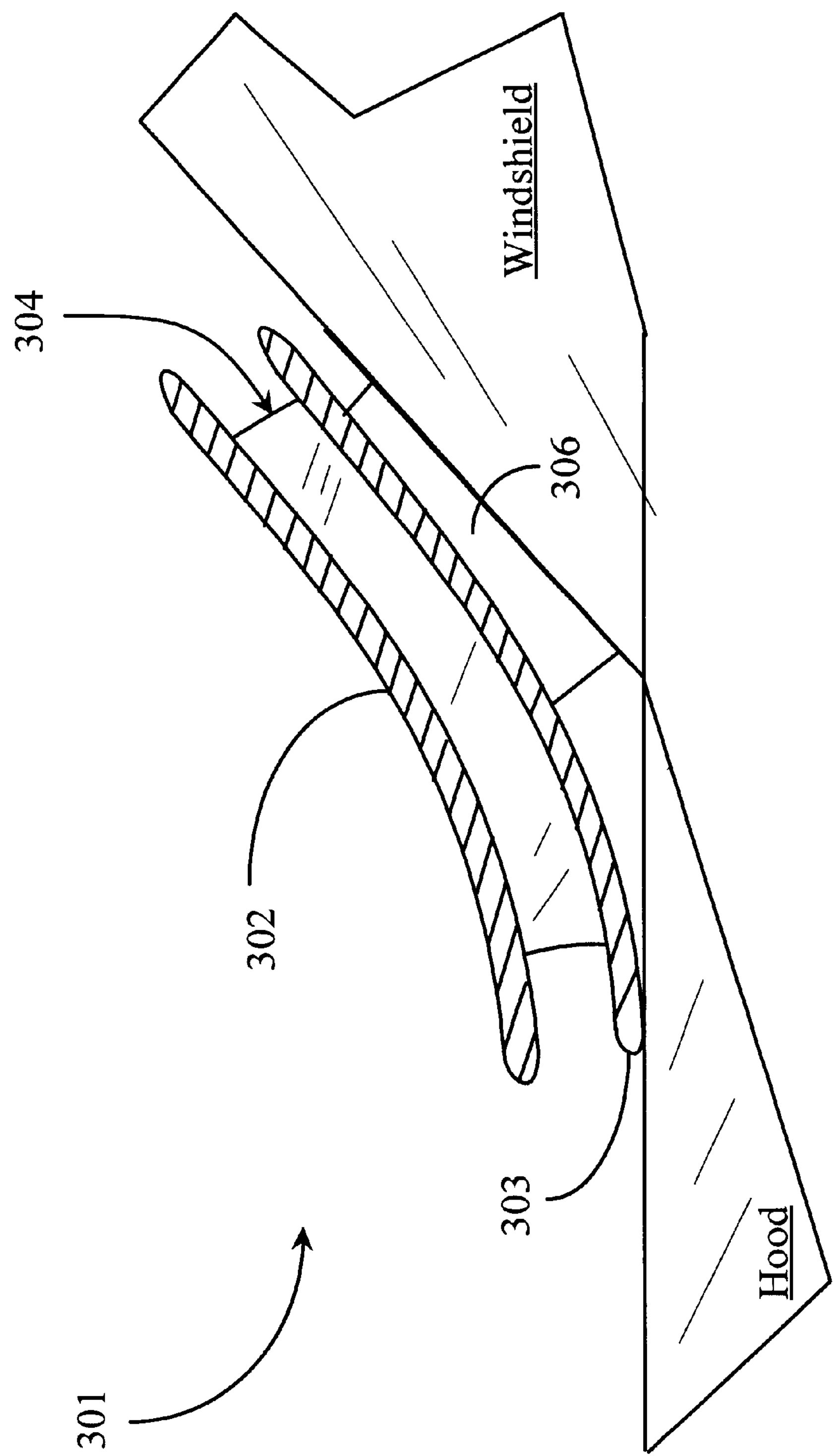
FIG. 5 is a section view illustrating the elevation profile of the bug foil apparatus of FIG. 4.

FIG. 5 is a section view illustrating an elevation profile of bug foil 301 of FIG. 4. Bug foil 301 is curved for airflow redirection according to a preferred embodiment of the present invention. Base foil 303 is flush against the vehicle hood at its forward position redirects air into the foil channels formed of the space between foil 303 and foil 302 set apart by support fins 304. In one embodiment of the present invention, an adjustment mechanism (not shown) may be provided to properly adjust the side profile of foil 301 to the angle of protrusion of the windshield above the hood of the vehicle. Such a mechanism could be incorporated in an embodiment where foils 302 and 303 are disposed on an axle that is rotatable and directly controlled by such as a turn knob disposed at either or both ends of the foil. In this case, windshield feet 306 would also be adjustable and a separable part of the assembly.

In this example, bug foil 301 is rigid and is manufactured with the appropriate curve. In still another embodiment, shims may be used under feet 306 to adjust the elevation angle of foil 301. There are many possibilities that do not depart from the spirit and scope of the invention. As can be seen in this example, the tail ends at some length of both foils 303 and 302 lie in a substantially parallel plane with the angle of windshield 306, but in a state of elevation above the windshield.

Figure 6:
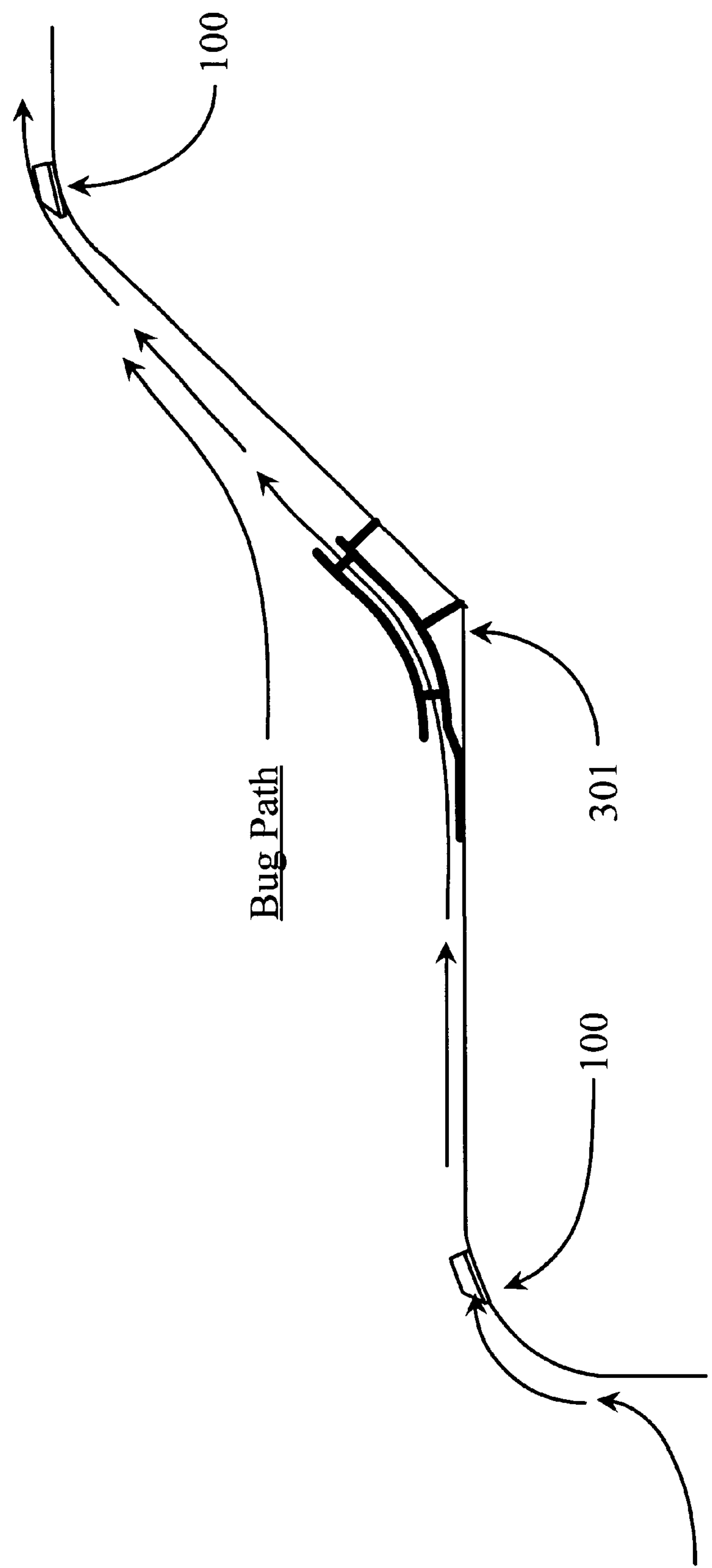
FIG. 6 is a diagram illustrating airflow through the array of vortex generators of FIG. 3 into the bug foil apparatus of FIG. 4 producing bug-divertive effects.

FIG. 6 is a use diagram illustrating airflow through a leading array of vortex generators of FIG. 3 into the bug foil of FIG. 4 producing bug-shielding effects. In this view, airflow against the body line at the start of the hood is channeled by an array of vortex generators 100 analogous to the array 100 described with reference to the example of FIG. 3 above. In this and other applications the undersurface of the vortex generators may be curved to facilitate mounting on the vehicle body.

The air becomes streamlined and turbulence is prevented along the hood line. The laminar flow has a much lower drag coefficient than turbulent flow, and creates less drag on the vehicle, therefore decreasing overall drag and improving fuel efficiency.

At the back of the hood the laminar air flow is directed into the scoop formed by the base and upper foil of bug foil 301. At this point the air flow is re-directed into the direction parallel to the surface of the windshield. In some cases the spacing is adjusted to accelerate the air flow as well. At normal freeway driving speeds the density and velocity of the laminar flow parallel to the windshield is sufficient to prevent any bugs or other lightweight debris from coming into contact with the windshield. Debris and bugs are captured in the air flow and diverted upward parallel to the windshield, and do not come into contact with the windshield.

In tests with no bug foil windshields are shown to be covered with smashed bugs. With the bug foil in an embodiment of the invention, at moderate highway speed, a lower portion of the windshield is bug-free up to a distinct line, and bugs decorate the windshield above that line. As speed is increased, the line is elevated until, at some speed, no bugs impinge on the windshield. Adjustment of length and spacing of the foils effects the speed at which the windshield becomes bug-free.

One with skill in the art of aerodynamics will recognize the significance of the uniform airflow traveling at high velocity parallel to the windshield as an effective bug deflecting mechanism.

In view of the many embodiments presented herein and those possible without departing from the spirit and scope of the invention but not specifically described, the present invention should be afforded the broadest possible scope under examination. Only the claim language that follows should limit the spirit and scope of the invention.

What is claimed is:

1. An aerodynamic bug diversion system for creating and directing an airflow shield to prevent bugs and other lightweight debris from hitting the windshield of a moving vehicle comprising:

an array of vortex generators affixed in a line substantially at a right angle to the direction of vehicle travel at a leading edge of the vehicle for creating a channeled and uniform laminar airflow; and an airfoil having at least 2 foils held spaced apart and substantially parallel to one another for collecting and redirecting the airflow created by the vortex array;

characterized in that the airflow through the airfoil is redirected as a substantially flat and uniform flow traveling upward in a plane substantially parallel to the plane of the windshield providing a divertive shield against bugs and debris hitting the windshield.

2. The bug diversion system of claim 1 wherein the airfoil is formed of one polymer piece in a molding operation.

3. The bug diversion system of claim 1 wherein the airfoil is formed of 2 or more polymer pieces and is assembled.

4. The bug diversion system of claim 1 wherein the at least two foils are held spaced apart by a plurality of support fins, the fins aiding in channeling the air flow.

5. The bug diversion system of claim 1 wherein the airfoil is formed of aluminum.

6. A method for preventing bugs and other lightweight debris from hitting the windshield of a vehicle, comprising steps of:

(a) collecting an incoming airflow in an airfoil having at least an upper foil and a base foil while the vehicle is in motion, the airflow channeled, prior to the airfoil, through an array of vortex generators; and (b) redirecting the collected airflow through the airfoil in an upward direction substantially parallel to the windshield.

7. The method of claim 6 wherein in step (a) the airfoil is a contiguous piece formed in a molding operation.

8. The method of claim 6 wherein in step (a) the airfoil is formed of 2 or more pieces that are assembled together.

9. The method of claim 6 wherein in step (a) the airfoil is adjustable in one or both of spacing and direction.

10. The method of claim 6 wherein in step (a) the foils comprising the airfoil are held apart by a plurality of support fins, the fins aiding in channeling the air flow created by the vortex array.

11. The method of claim 6 wherein in step (b) redirection is accomplished through curvatures formed in the airfoil.

* * * * *